(12) United States Patent  (10) Patent No.: US 7,463,385 B2
Gondak et al.  (45) Date of Patent: Dec. 9, 2008

(54) COLOR MAP SELECTION

(75) Inventors: Jay S. Gondak, Camas, WA (US);
Je-Ho Lee, San Diego, CA (US); Ranjit
Bhaskar, Portland, OR (US)

(73) Assignee: Hewlett-Packard Development
Company, L.P., Houston, TX (US)

( * ) Notice: Subject to any disclaimer, the term of this
patent is extended or adjusted under 35
U.S.C. 154(b) by 694 days.

(21) Appl. No.: 11/173,010

(22) Filed: Jun. 30, 2005

(65) Prior Publication Data

US 2007/0002345 A1 Jan. 4, 2007

(51) Int. Cl.
G06K 15/00 (2006.01)
(52) U.S. Cl. ............... 358/1.9; 358/2.1; 358/3.23;
358/523; 345/602
(58) Field of Classification Search ............ 358/1.9,
358/523, 524, 2.1, 3.23; 345/593, 601, 602;
382/162, 167
See application file for complete search history.

(56) References Cited

U.S. PATENT DOCUMENTS

| 5,218,671 | A | 6/1993 | Liao et al. | |
| 5,254,978 | A | 10/1993 | Beretta | |
| 5,307,182 | A | 4/1994 | Maltz | |
| 5,596,428 | A | 1/1997 | Tytgat et al. | |
| 5,875,260 | A | 2/1999 | Ohta | |
| 5,909,220 | A | 6/1999 | Sandow | |
| 5,915,075 | A | 6/1999 | Kadowaki | |
| 6,075,888 | A | 6/2000 | Schwartz | |
| 6,081,344 | A * | 6/2000 | Bockman et al. | 358/1.9 |
| 6,137,595 | A | 10/2000 | Sakuyama et al. | |
| 6,198,543 | B1 * | 3/2001 | Ryan | 358/1.9 |
| 6,269,184 | B1 | 7/2001 | Spaulding et al. | |
| 6,307,961 | B1 | 10/2001 | Balonon-Rosen et al. | |
| 6,351,320 | B1 * | 2/2002 | Shin | 358/1.9 |
| 6,388,674 | B1 | 5/2002 | Ito et al. | |
| 6,414,690 | B1 | 7/2002 | Balasubramanian et al. | |
| 6,421,141 | B2 | 7/2002 | Nishikawa | |
| 6,430,311 | B1 | 8/2002 | Kumada | |
| 6,456,404 | B1 | 9/2002 | Furuya et al. | |
| 6,480,202 | B1 | 11/2002 | Deguchi et al. | |
| 6,483,607 | B1 | 11/2002 | Van de Capelle et al. | |
| 6,522,427 | B1 | 2/2003 | Bhattacharjya et al. | |
| 6,532,081 | B1 | 3/2003 | Cecchi et al. | |
| 6,559,982 | B1 | 5/2003 | Gondek | |
| 6,560,358 | B1 | 5/2003 | Tsukada | |
| 6,947,589 | B2 * | 9/2005 | Newman et al. | 382/162 |
| 7,268,897 | B1 * | 9/2007 | Moro et al. | 358/504 |
| 7,355,745 | B2 * | 4/2008 | Hudson et al. | 358/1.9 |
| 2003/0169439 | A1 * | 9/2003 | Hanyu | 358/1.9 |
| 2004/0223172 | A1 * | 11/2004 | Yoshizawa et al. | 358/1.8 |
| 2005/0007608 | A1 * | 1/2005 | Yamamoto et al. | 358/1.9 |
| 2005/0052667 | A1 * | 3/2005 | Yamazaki et al. | 358/1.9 |
| 2005/0083558 | A1 * | 4/2005 | Kim | 358/523 |
| 2005/0212907 | A1 * | 9/2005 | Teraue | 347/254 |
| 2006/0114482 | A1 * | 6/2006 | Song et al. | 358/1.9 |
| 2007/0195345 | A1 * | 8/2007 | Martinez et al. | 358/1.9 |

* cited by examiner

Primary Examiner—Kimberly A Williams

(57) ABSTRACT

Systems, devices, and methods performed by program instructions, are provided for color map selection. One method includes instructions which execute to generate a first color map from a set of colors. The instructions execute to generate a second color map from the set of colors and an additional color and to select a color value from between the first color map and the second color map dependent on a presence of the additional color.

24 Claims, 6 Drawing Sheets

COLOR MAP SELECTION

INTRODUCTION

Color maps can be created for various combinations of printer inks/toners. Color maps may also account for particular print media, and print mode combinations. Various printer systems with swappable ink cartridges have the ability to reconfigure to different color combinations for imaging. For example, with the HP 101 blue photo cartridge, available from Hewlett-Packard, a user is able to add an additional color to the printer system by inserting a new ink pen. The printer system may recognize the addition of the new pen and swap to a printing configuration that includes this secondary color, e.g., blue.

When a particular color is added to the set of original colors in a printer, a new color map may be generated. The new color map may shift color values (also referred to as nodes in a color map) from the values provided by the previous color map used by the system. This shift in color values, or nodes, may produce a change in visible colors printed on a print media which is detectable to the human visual system.

DETAILED DESCRIPTION

Figure 1:
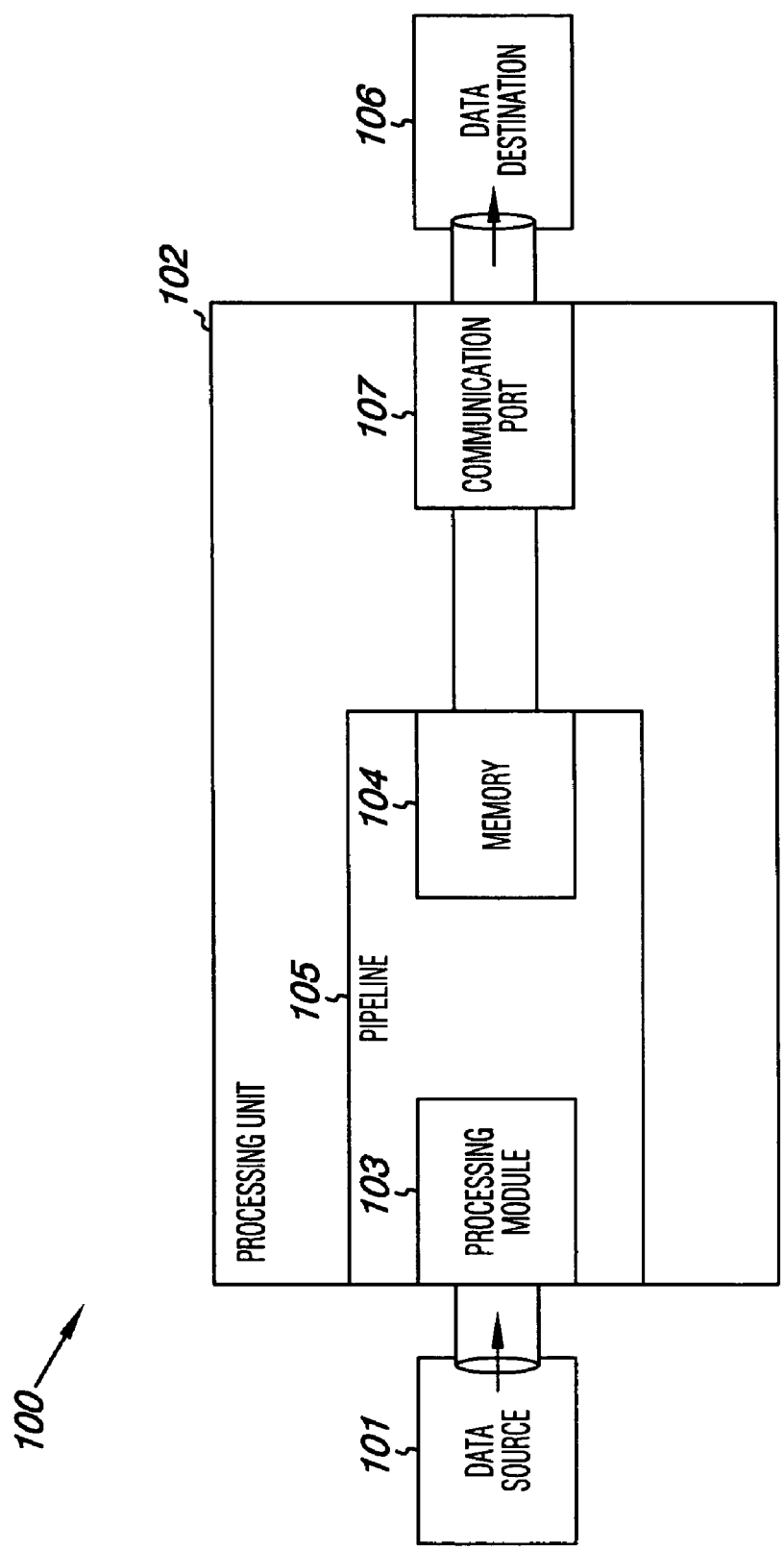
FIG. 1 is an example system for processing image data.

Embodiments include systems, devices, and methods performed by program instructions for color map selection. One method includes instructions which execute to generate a first color map from a set of colors. The instructions execute to generate a second color map from the set of colors and an additional color and to select a color value from between the first color map and the second color map dependent on a presence of the additional color. Embodiments described herein can be implemented with color maps formed according to a number of color space conventions. Various color space conventions include RGB (Red, Green, and Blue), CIE (Commission International de l'Eclairage tristimulus specification), L*a*b* (Luminosity, a*-chromaticity layer (red-green balance), and b*-chromaticity layer (blue-yellow balance)), LCH (Luminance, Chroma, and Hue), CMYK (Cyan, Magenta, Yellow, and Black), and ICC (International Color Consortium), among others.

As the reader will appreciate, a color can be represented by various primary colors and various secondary colors in a given color space. Primary colors are colors that cannot be created by mixing other colors in the color gamut of a particular color space. Combining two primary colors forms a secondary color. For example, with projected light, such as in a computer monitor, red (R), green (G), and blue (B) are considered as the three primary colors. In a printing system, cyan (C), magenta (M), and yellow (Y) are considered as the three primary colors. RGB are considered secondary colors in the printing system. Conversely, CMY are considered secondary colors with projected light.

The color gamut is the total range of colors a device or system can produce. If the color space is considered as a three dimensional space, the primary colors can be considered as the x, y, and z axes of the cube. Primary colors may themselves be mixed to produce most of the colors in a given color space. For example, mixing equal intensities of G and B in RGB color space yields cyan C, while R plus B yields magenta M, and R plus G yields yellow Y. Tertiary colors are created by mixing equal amounts of a primary color and a secondary color formed of different primary colors.

Projection devices such as computer monitors and scanning devices use the RGB color space while printing devices such as ink jet printers and laser printers use CMY color space. When RGB pixel values are sent to a printer, the RGB values will have to be converted into the printer's CMY color space. The RGB color space may contain a larger color gamut than that available in CMY color space, e.g., due to hardware constraints of a printing device. As such, when RGB values capable of representing four distinguishable shades of blue in RGB color space are sent to a printer, the printer's CMY color space may produce only one shade of blue from the four shades that were available in RGB color space.

For this reason, some printing devices include additional color inks/toners. Indeed, some photo printers include an eight or more ink configuration to expand their color gamut. For example, a photo printer may include three tri-chamber ink pens. One pen may include C, M, and Y. A second pen may include light cyan, light magenta, and black (K). The third pen may include light gray, dark gray, and another K. Since there are two K ink chambers, this printing system is really considered an eight ink system. Program instructions can execute to recognize this printing configuration and will execute to generate an associated 8-ink color map. As noted above, a user may from time to time swap pens, e.g., purchase a pen which provides a secondary color such as blue, to substitute for the duplicate K's. Embodiments, however, are not limited to this example and can include any additional secondary and/or tertiary color addition to a previous ink configuration. As the reader will appreciate when the additional ink is added to a given printing system, program instructions will execute to generate a new color map appropriate for the inks then present in the system.

FIG. 1 is an example system 100 for processing image data. As noted above, when image data from one color space convention, e.g., RGB, is transferred to another color space convention, e.g., CMY, image pixel data is converted. Such a conversion, among other image processing, may be performed in the system illustrated in FIG. 1.

FIG. 1 illustrates a data source 101 that provides image pixel data to be processed, a processing unit 102, and a data destination 106 for receiving the processed image pixel data. The processing unit 102 provides a processing pipeline 105 that can be used to process various color channels, e.g., color planes, associated with various colors of input image pixel data.

The data source 101 can include various data source types capable of outputting monochrome and/or color pixel data. For example, the data source 101 can be a device or component of a device that outputs RGB color image pixel data such as a scanning device or computer display. The processing pipeline 105 can couple a number of processing modules 103, memory 104, and communication port(s) 107. Examples of the functions that processing modules can provide include color space conversion (as mentioned above), halftoning, and image enhancement, among others. Memory 104 can be resident on or connected to the processing unit 102. Memory 104 can be used to store program embodiments and processed data. Processed data can be routed from memory 104 to various data destinations 106, e.g., an ink jet printing mechanism, laser printing mechanism, etc. The data destination 106 can receive the data via a communication port 107, e.g., via a peripheral component interconnect (PCI) bridge, and can print the transmitted color image pixel data on print media.

Across the color planes in an RGB color space, a selected input RGB value can include a combination of color values from each of three color planes. Hence, a particular shade of blue may have an input RGB color value including three different values. For example, a particular input RGB value can include a color value of 66 from the red color plane (R), a color value of 11 from the green color plane (G), and a color value of 243 from the blue color plane. A conversion or translation is performed on these values by executing instructions in a processing module, e.g. 103, when the RGB values are sent to the ink color space of a printing device.

The processing modules 103 within the processing unit 102 can include one or more integrated circuits or other structures that operate on program instructions, i.e., software and/or firmware, to perform pixel processing operations described herein. The embodiments of the invention, however, are not limited to any particular operating environment or to instructions written in a particular programming language. Software, firmware, and/or processing modules, suitable for carrying out embodiments of the present invention, can be resident in one or more devices or locations. Processing modules can include separate modules connected together or include several modules on an application specific integrated circuit (ASIC).

Figure 2:
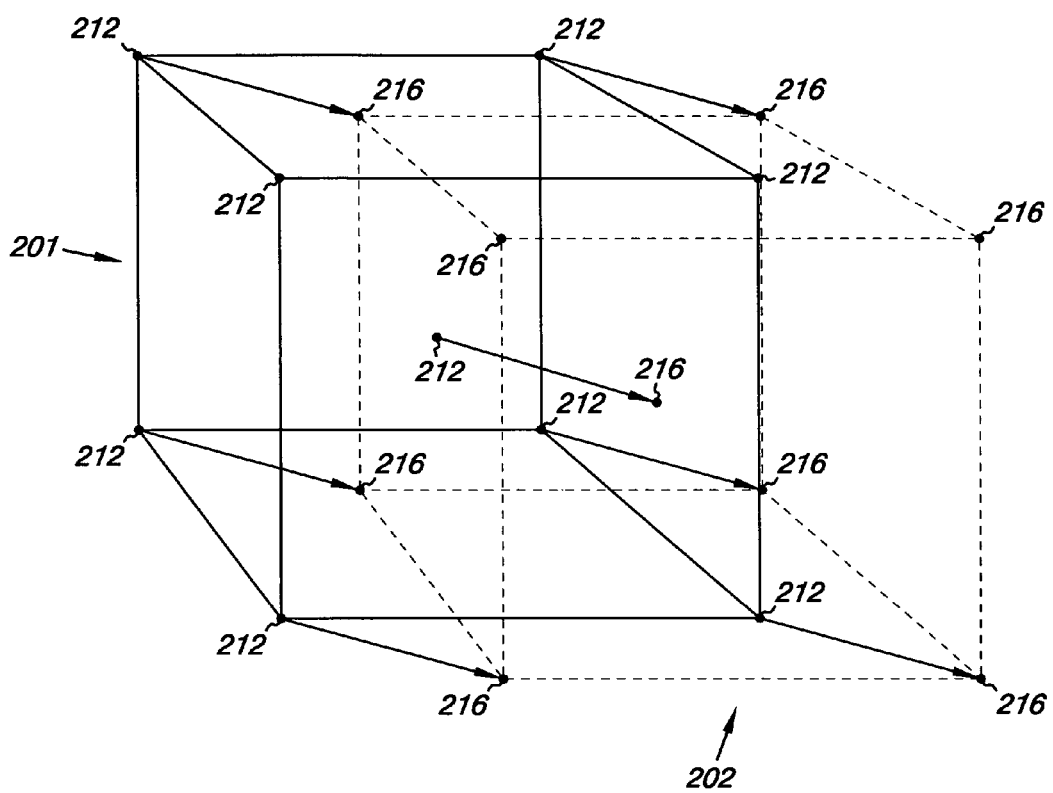
FIG. 2 illustrates a shift in the color values between a first color map and a second color map.

FIG. 2 illustrates a shift in the color values between a first color map and a second color map when an addition, deletion, and/or substitution is made to the colors in a printing system. That is, as described above, when a color in a printing system is changed, program instructions will execute to generate a new color map for the printing system. As shown in FIG. 2, a first color map 201 is illustrated having a number of color values 212. If, as described above, a color is added, deleted (e.g. removed), or substituted in the printing system the program instructions can execute to generate a new, e.g., second, color map 202. FIG. 2 is a three dimensional representation as may be associated with three color planes, e.g., associated with CMY in a printing system. This three dimensional representation is provided for ease of graphic illustration, however, the reader will appreciate that embodiments described herein are not limited to three color planes. As one of ordinary skill in the art will appreciate, by adding dimensions, this conception of color space can apply to as many colors as one wishes to add to a printing system configuration. By way of illustration and not limitation, the first color map 201 could be defined to represent an 8-ink (or toner) system including eight different colors, while the second color map 202 could be defined to represent a 9-ink (toner) system including nine different colors.

As the reader will appreciate, the first color map 201 may still be stored, e.g., saved in memory, in the printing system. Previously, however, absent a user physically inputting a selection between different available color maps stored on the system, the second color map 202 would be used for all purposes going forward until another addition, deletion, and/or substitution caused the program instructions to execute to generate yet another color map.

As described above and illustrated in FIG. 2, the new, e.g., second, color map 202 may shift color values from the values provided by the previous, e.g., first, color map used by the system. This is illustrated in FIG. 2 by the shift in nodes values from 212 to 216. As described in the example above, the second color map 202 may be generated as a result of adding a secondary and/or tertiary color to the printing system, e.g., blue ink. This shift in color, or node, values may produce a change in visible colors printed on a print media which is detectable to the human visual system.

To resolve this issue, embodiments of the present invention provide program instructions that execute to select between one color map and one or more additional color maps, e.g., a first color map and a second color map, based on the presence of a particular color. Such program instructions can be provided to the memory 104 and/or processing modules 103 of an imaging pipeline as described in connection with FIG. 1. More detail on the execution of various embodiments for these program instructions is provided below in connection with FIGS. 3A and 3B. Embodiments are discussed in reference to a first and a second color map, and in reference to an additional color. However, the reader will appreciate embodiments are not limited to use with two color maps or one additional color.

Figure 3A:
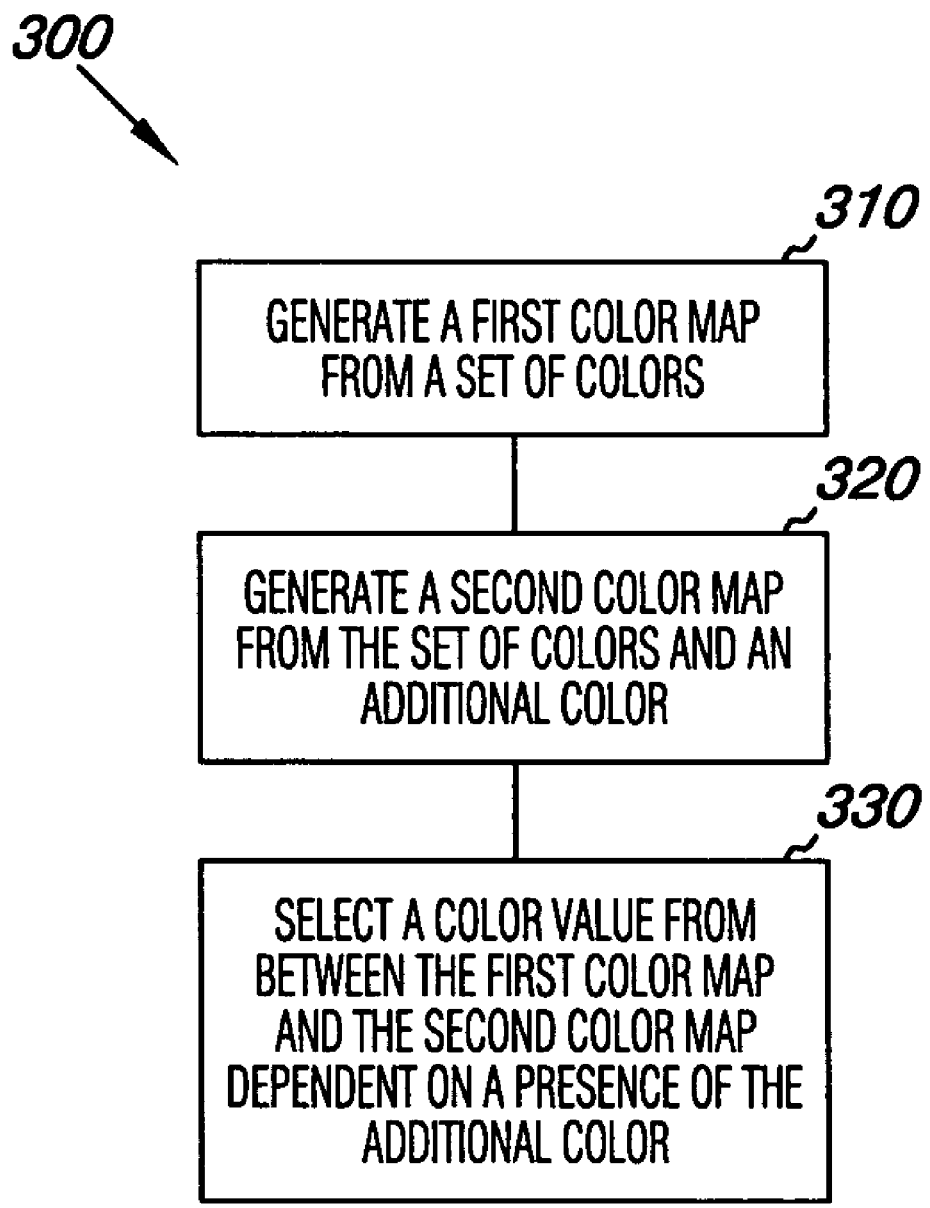
FIG. 3A illustrates a method embodiment.

FIG. 3A illustrates a method embodiment performed according to the execution of program instructions described herein. As shown in FIG. 3A, program instructions can execute to generate a first color map from a set of colors, as shown at block 310. One of ordinary skill in the art will appreciate the manner in which program instructions can be executed to generate a color map appropriate for each set of printer inks/toner, media, and print mode combinations, etc., in a given printing system. As shown at block 320, the method includes generating a second color map, e.g., when a new color is added to a printing system.

In the embodiment shown in FIG. 3A, the method includes generating a second color map from the set of colors, e.g., those present in the first color map in block 310, and an additional color. For example, as given in the example above, the set of colors can include C, M, Y, K, light cyan, light magenta, light gray, dark gray, and another K as part of an eight ink system. The additional color can then include a color selected from a secondary group or tertiary color group, e.g., blue ink in the example above. Thus, program instructions, recognizing the printing configuration now includes the additional color, will execute to generate the second color map as an associated 9-ink color map. In this example discussed herein the second, e.g., 9-ink color map, includes the color blue. Embodiments, however, are not limited to this example.

According to various embodiments, as shown at block 330, the program instructions execute to select a color value from between the first color map and the second color map dependent on a presence of the additional color. One of ordinary skill in the art will appreciate the manner in which a presence of the additional color can be detected and/or the size (e.g., weight of its presence relative to other color values present in image pixel data) of the additional color can be determined, e.g., in decomposed image data.

For example, the additional color of blue ink may be added to the system configuration. The program instructions can detect the additional color and generate the second color map as described above. The printing device, e.g., a photo printer, can further receive image pixel data from a source such as a scanning device and/or digital camera, etc., using an RGB color space convention. The processing modules 103, e.g., executable instructions operating on this input image pixel data in an imaging pipeline 105, such as shown in FIG. 1, can decompose the input image pixel data to detect whether a given pixel value has the presence of the color blue.

Methods for decomposition and detection of a color are appreciated by one of ordinary skill in the art. By way of example and not by way of limitation, an input image pixel expressed in RGB color space could be decomposed initially into a 30% R value, 40% G value, and 60% B value. Recognizing that white light consist of equal parts of RGB, the input image pixel could be further decomposed into a 10% G value and 30% B value by subtracting the percentage value of the smallest color component from all percentage values of RGB color components. In this example, the smallest color component is R and subtracting 30% from each component color percentage yields 10% G and 30% B. One of ordinary skill in the art will also appreciate that an equal contribution of G and B can be represented by the ink color cyan (C). Hence, repeating the above sequence, the resulting smallest color component is G and subtracting 10% from the remaining G and B components yields 20% B. Blue is therefore still present in this input image pixel, after decomposition. Embodiments are not limited to the example image pixel value decomposition process described above.

An output image pixel value that included the additional color blue, e.g., added to the set of colors in the first color map, could, in this example, improve the accuracy of the output image generated. Accuracy, as used herein, is intended to mean the closeness in color values and color perception between a color displayed on a source device such as a monitor, digital camera, scanner, etc., and a color presented on a destination or target device, e.g., the print media of a printer. That is, by including a blue pixel value for the added blue pen in the color space conversion process this particular pixel value can produce an output image which is closer to the input image.

One advantage of the present embodiments is that the above described decomposition process can be performed on a pixel by pixel basis. And, the program embodiments described herein can execute to select between choosing a color value from the second color map, e.g., the 9-ink color map including color values for blue, when the presence of residual blue is detected, or a color value from the first color map, e.g., the 8-ink color map not including color values for blue, when the presence of residual blue is not detected. Thus, according to various embodiments, a user may experience a greater degree of consistency between image reproductions produced before the additional color was added to the system configurations and those produced after in regards to output image pixels that do not contain a presence of the additional color.

CMYK has been considered acceptable for print reproduction of a variety of images, but addition of specific colors to the configuration can provide better results for certain images. Image reproductions can be improved if inks or toners are specifically chosen with reference to the original image. For example, if the image had a high content of blue, when compared to all the other colors, reproduction could be improved by addition of blue ink or toner to the color mixture. Adding blue could better represent the subtleties and intensity of blue in the original image because mixing cyan and magenta yields fewer shades of blue. The use of inks or toners specifically chosen for printing can make the reproduction more accurate with richer colors than the basic CMYK print configuration.

Figure 3B:
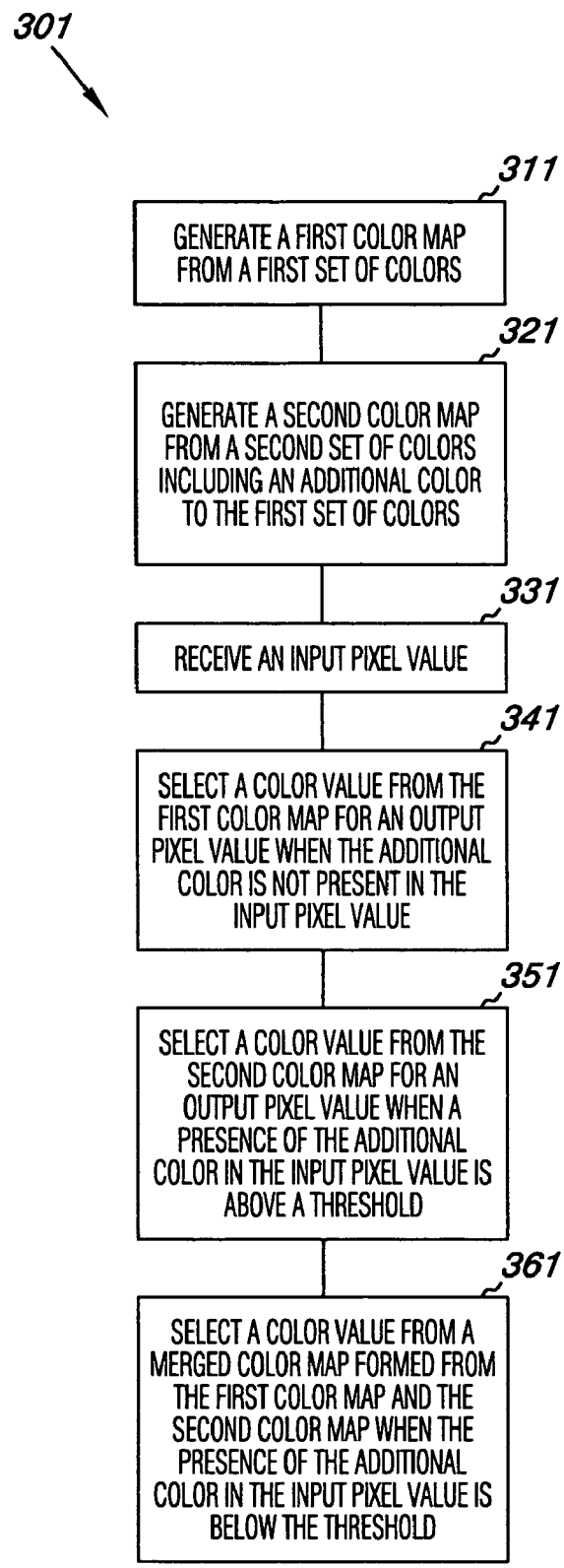
FIG. 3B illustrates another method embodiment.

FIG. 3B illustrates another method embodiment performed according to the execution of program instructions described herein. As shown in FIG. 3B, program instructions can execute to generate a first color map from a set of colors, as shown at block 311, and to generate a second color map from a second set of colors including an additional color to the first set of colors, as shown at block 321, as the same has been described in connection with FIG. 3A. At block 331, the method includes receiving an input pixel value.

At block 341, the program instructions execute to select a color value from the first color map for an output pixel value when the additional color is not present in the input pixel value. That is, if the input pixel value does not contain the additional color, then the color values for producing an output pixel value for this particular input pixel are chosen from the first color map. As described in connection with FIG. 3A, the input pixel value can be decomposed to detect the presence or absence of the additional color. At block 351, the program instructions execute to select a color value from the second color map for an output pixel value when a presence of the additional color in the input pixel is above a threshold. By way of example and not by way of limitation, the above described decomposition is to detect the presence of the additional color as a percentage of the color components, instead of merely determining its presence or absence. According to various embodiments a particular percentage is used as the threshold for determining when to select the color value from the second color map. For example, in one embodiment if the percentage of the additional color component is 10% or greater, then the program instructions execute to select the color value from the second color map. Otherwise, the program instructions execute to select the color value from the first color map, e.g., the color map which does not contain the additional color ink. In other words, if the input pixel value does contain the additional color component equal to or above the percentage threshold, then the color values for producing an output pixel value for this particular input pixel are chosen from the second color map. Embodiments are not limited to the threshold percentage provided in the above example.

The embodiment illustrated in FIG. 3B further includes program instructions that execute to select a color value from a merged color map formed from the first color map and the second color map when the presence of the additional color in the input pixel value is present but below the threshold as shown in block 361. One of ordinary skill in the art will appreciate the manner in which a merged color map can be created from a combination of two different color maps. The same is not described in more detail here so as not to obscure the embodiments of the invention. In this embodiment, the program instructions execute to determine if the presence of the additional color is in a particular range, e.g., greater than 0% but less than 10% percent of the primary and secondary color components. In this example embodiment, to smooth the transition between the different color map outputs, which might otherwise be apparent to the human visual system, input pixel values which contain an amount of the additional color in a particular range can cause program instructions to execute to correspondingly use a color value contribution from the second color map in a gradual manner from 0-100%.

As the reader will appreciate, the program instructions can execute to transition between a first color map, a merged color map, and a second color map even for color maps that are not indexed to RGB color space. That is, another example for transitioning output pixel values from a first color map, through a merged color map, to a second color map can include the program instructions performing calculations in L*a*b* color space as defined by CIE. In L*a*b* color space, color can be expressed in terms of Luminosity, an a*-chromaticity layer (i.e., red-green balance), and a b*-chromaticity layer (i.e., blue-yellow balance). The relationship between these various components of color can be graphically presented as a circle where chroma (i.e., colorfulness) is defined as the radius, the center of the circle is neutral, and colorfulness increases moving outward along the radius from the center. In L*a*b* color space, hue is expressed as an angle equal to the arc tangent of a*/b*. Thus, according to various embodiments, the determination by the program instructions as to whether to select color values from the first, the merged, and one or more additional color maps can be based on a hue angle and a chroma value.

For example, in one embodiment, where the additional color is blue, the program instructions will execute to select color values from the second color map when the hue angle is between 200 to 340 degrees and the chroma value is greater than 5 as expressed in L*a*b* color space. In this example embodiment, the program instructions can execute to select color values from the first color map when the hue angle is not within the range of 200 to 340 degrees or the chroma value is less than 5. Likewise, the program instructions can execute to select color values from the merged color map when the hue angle is between 200 to 340 degrees and the chroma value is greater than 5. That is, the program instructions can execute to determine when a chroma value is greater than 5 and when a hue angle is between 200 to 340 degrees and can execute to select color values from the merged color map when these conditions are met. Embodiments are not limited to this example. In other words, such expressions can define the particular ranges for using color values from the first, the merged, and the one or more second color maps.

Figure 4:
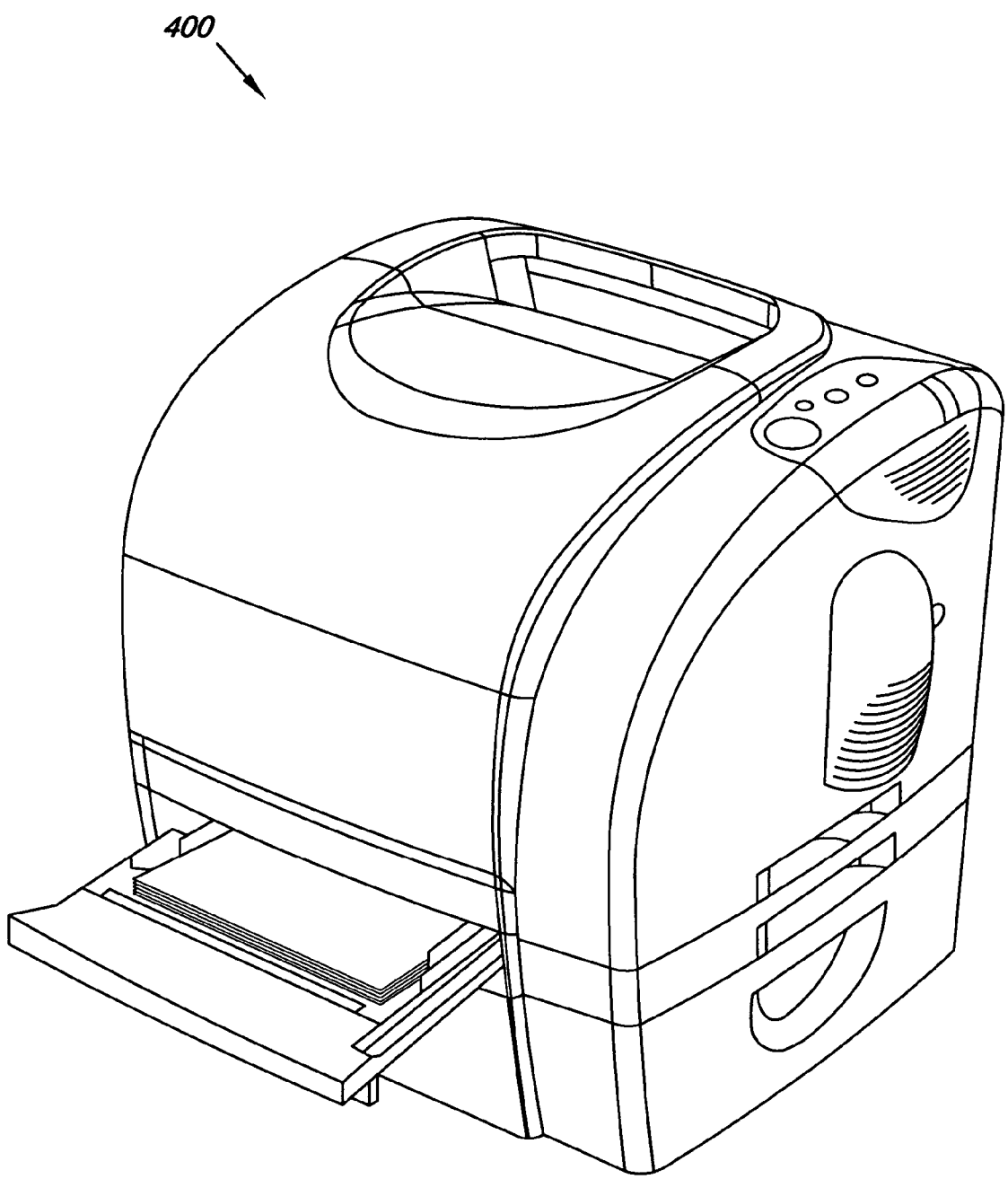
FIG. 4 illustrates an example printing device suitable to implement embodiments described herein.

FIG. 4 illustrates an example printing device 400 suitable to implement embodiments described herein. The printing device 400 can generate a first color map from a set of colors available to the device 400. The device 400 can generate a second color map from the set of colors and an additional color, e.g., when a new color is added to the device. And, the device 400 can select a color value from between the first color map and the second color map dependent on a presence of the additional color. As one of ordinary skill in the art will appreciate, the device 400 may be configured to a number of different colors. The printing device 400 can represent an ink jet printer or a laser printer using dry or liquid electrophotography. Embodiments are not so limited.

Figure 5:
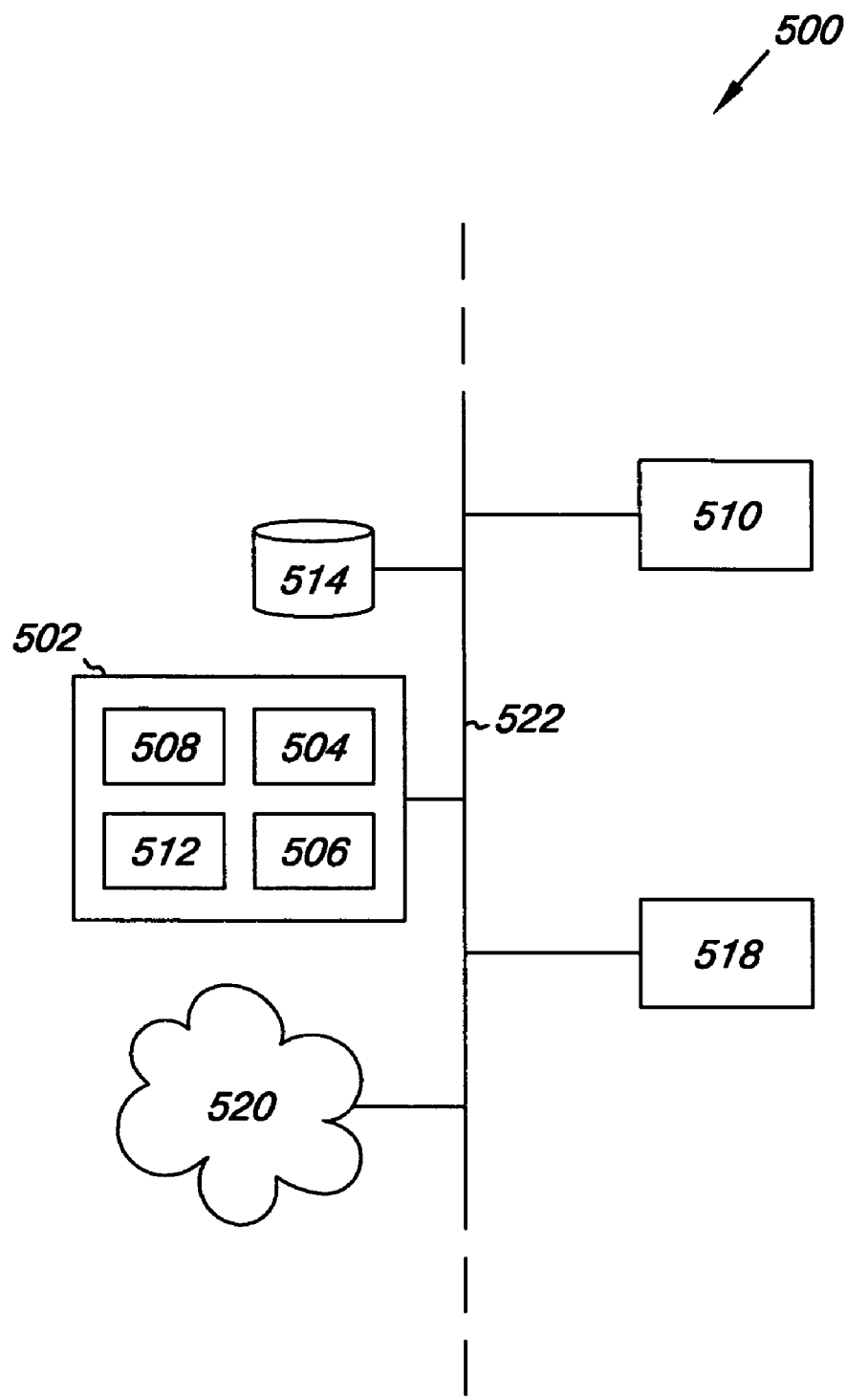
FIG. 5 illustrates an example network suitable to implement embodiments described herein.

FIG. 5 illustrates an example network suitable to implement embodiments described herein. The network 500 of FIG. 5 includes a printing device 502 and includes an image source device such as a host computer display, digital camera, and/or a scanning device, e.g., 518. The printing device 502 is operable to print a sheet, e.g., print media, having one or more images, which may contain text, images, photos, and/or graphics, etc., that are applied to the print media using color map selection techniques described herein. That is, various processing modules can be included in the printing device 502, some which perform a color space transformation and select color values from between different color maps based on the presence of a particular color in input pixel data.

The printing device 502 can include one or more processors 504 and one or more memory devices 506. In one embodiment the processor 504 and memory 506 are operable to execute program instructions to implement the color map selection techniques described herein. Memory provides a computer readable medium. Memory, as the same is used herein, can include any suitable memory for implementing the various embodiments of the invention. Thus, memory includes fixed memory, such as a hard drive, a memory chip on a printed circuit board, a portable memory, such as a memory card, memory stick, flash card and the like. One of ordinary skill in the art will appreciate the manner in which program instructions can be stored on such memory medium. Other memory mediums include CDs, DVDs, and floppy disks. The present invention, however, is not limited to any particular type of memory medium. In addition, the invention is not limited to where, within a device or networked system, a set of computer instructions reside for use in implementing the various embodiments of invention.

The printing device 502 as illustrated includes a printing device driver 508 and a print engine 512. Various additional printing device drivers can be located off the printing device, for example, on the remote device 510. Such printing device drivers can be an alternative to the printing device driver 508 located on the printing device 502 or provided in addition to the printing device driver 508. A printing device driver 508 is operable to create a computer readable instruction set for a print job utilized for rendering an image by the print engine 512.

As shown in the embodiment of FIG. 5, printing device 502 can be networked to one or more remote devices 510 over a number of data links, shown as 522. The number of data links 522 can include one or more physical and one or more wireless connections, and any combination thereof, as part of a network. That is, the printing device 502 and the one or more remote devices 510 can be directly connected and can be connected as part of a wider network having a plurality of data links 522.

The remote device 510 can include a device having a display, or monitor, such as a desktop computer, laptop computer, a workstation, hand held device, etc. Likewise, the remote device 510 can include a scanner or other device as the same will be known and understood by one of ordinary skill in the art. The remote device 510 can also include one or more processing units and/or processing modules suitable for running software and can include one or more memory devices thereon according to embodiments described herein. FIG. 5 illustrates that one or more storage devices 514, e.g., remote storage database, etc., can be connected to the network 500. Likewise, the network 500 can include one or more peripheral devices 518, Internet connections 520, etc. The network 500 illustrated in FIG. 5 can include any number of network types including, but not limited to, a Local Area Network (LAN), a Wide Area Network (WAN), Personal Area Network (PAN), and/or a wireless LAN, WAN, and/or PAN. Data links 522 within such networks can include any combination of direct or indirect wired and/or wireless connections, including but not limited to electrical, optical, and RF connections.

Although specific embodiments have been illustrated and described herein, it is to be understood that the above descriptions have been made in an illustrative fashion and not a restrictive one. Those of ordinary skill in the art will appreciate that an arrangement calculated to achieve the same results with different permutations of the disclosed techniques can be substituted for the specific embodiments shown or described. This disclosure is intended to cover adaptations or variations of the described embodiments of the invention. Alternative combinations of the above embodiments, and other embodiments not specifically described herein, will be apparent to those of skill in the art upon reviewing the above description. The scope of the various embodiments of the invention includes other applications in which the software, firmware, hardware, devices, methods, and systems described herein are utilized. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter may lie in less than all features of a single disclosed embodiment. Thus, the following claims are hereby incorporated into the Detailed Disclosure by reference, with each claim standing on its own as a separate embodiment.

What is claimed:

1. A printing device, comprising:
   a processor;
   a memory coupled to the processor; and
   program instructions storable on the memory and executable by the processor to:
   generate a first color map from a set of colors;
   generate a second color map from the set of colors and an additional color;
   select a color value from between the first color map and the second color map dependent on a presence of the additional color in decomposed image data;
   generate a merged color map from the first color map and the second color map; and
   select a color value from the merged color map when the presence of the additional color in decomposed image pixel data is within a particular range.

2. The printing device of claim 1, wherein the instructions include instructions to:
   receive image pixel data;
   decompose the image pixel data to determine the presence of the additional color;
   select a color value from the first color map if the additional color is not detected in the decomposed image pixel data; and
   select a color value from the second color map if the additional color is detected.

3. The printing device of claim 1, wherein the additional color is selected from the group of a secondary and a tertiary color group for the printing device.

4. A method for color map selection, comprising:
   generating a first color map from a set of colors;
   generating a second color map from the set of colors and an additional color; and
   selecting a color value from between the first color map and the second color map dependent on a presence of the additional color;
   generating a merged color map from the first color map and the second color map;
   receiving an input pixel value;
   decomposing the input pixel value to detect the presence of the additional color; and
   selecting a color value from the merged color map when the presence of the additional color in decomposed image pixel value is within a particular range.

5. The method of claim 4, wherein the method includes:
   selecting a color value from the first color map if the additional color is not detected; and
   selecting a color value from the second color map if the additional color is detected.

6. The method of claim 5, wherein the method includes detecting the presence of the additional color by examining a hue angle and a chroma value for the input pixel data in L*a*b* color space.

7. The method of claim 5, wherein the method includes computing a linearly weighted output pixel value based on a size of the additional color.

8. A printing device, comprising:
   a processor;
   a memory coupled to the processor; and
   program instructions storable on the memory and executable by the processor to:
   generate a first color map from a set of colors;
   generate a second color map from the set of colors and an additional color when the device detects the additional color;
   receive image pixel data;
   decompose image pixel data to determine the presence of the additional color in association with a given pixel;
   select a color value from the first color map if the additional color is not detected in the decomposed image pixel data;
   select a color value from the second color map if the additional color is detected.

9. The printing device of claim 8, wherein the additional color is selected from a secondary color group and a tertiary color group for the printing device.

10. The printing device of claim 8, wherein the program instructions further include instructions to:
    generate a merged color map from the first color map and the second color map; and
    select a color value from the merged color map when the presence of the additional color in decomposed image pixel data is within a particular range.

11. The printing device of claim 10, wherein the particular range includes a hue value range and a chroma value range in L*a*b* color space.

12. A method for color map selection, comprising:
    generating a first color map from a first set of colors;
    generating a second color map with from a second set of colors including an additional color to the first set of colors;
    receiving an input pixel value;
    selecting a color value from the first color map for an output pixel value when the additional color is not present in the input pixel value;
    selecting a color value from the second color map for an output pixel value when a presence of the additional color in the input pixel value is above a threshold; and
    selecting a color value from a merged color map, formed from the first color map and the second color map, when the presence of the additional color in the input pixel value is below the threshold.

13. The method of claim 12, wherein the method includes generating a first color map and a second color map which are indexed to an international color consortium standard.

14. The method of claim 12, wherein the method includes generating the second color map from the first set of colors and a secondary color for a given printing system.

15. The method of claim 12, wherein the method includes generating the second color map from the first set of colors and a tertiary color for a given printing system.

16. The method of claim 12, wherein the medium is located on a printing device and the printing device is connected to a scanner via a network.

17. A printing device, comprising:
    a processor;
    a memory coupled to the processor; and
    means for choosing a color map by dynamically selecting a color value from multiple color maps based on a presence of a particular color in decomposed image pixel data;
    the means further including program instructions storable in the memory and executable by the processor to:
    generate a first color map for a set of colors that does not include the particular color;
    generate a second color map that includes the set of colors and the particular color;
    receive image pixel data;

select a color value from the first color map when the particular color is not present in the image pixel data associated with a particular color;

select a color value from the second color map when the particular color is present in the image pixel data associated with a particular color;

generate a merged color map from the first color map and the second color map; and select a color value from the merged color map when the particular color value is present but is less than 10% of a given pixel value.

18. A computer readable medium having executable instructions stored thereon to cause a device to perform a method for color map selection, comprising:

generating a first color map from a set of colors;

generating a second color map from the set of colors and an additional color;

selecting a color value from between the first color map and the second color map dependent on a presence of the additional color;

receiving an input pixel value;

decomposing the input pixel value to detect the presence of the additional color;

selecting a color value from the first color map if the additional color is not detected in the decomposed input pixel value;

selecting a color value from the second color map if the additional color is detected; and computing a linearly weighted output pixel value based on a size of the additional color.

19. The medium of claim 18, wherein the method includes detecting the presence of the additional color by examining a hue angle and a chroma value for the input pixel data in L*a*b* color space.

20. A computer readable medium having executable instructions stored thereon to cause a device to perform a method for color map selection, comprising:

generating a first color map from a first set of colors;

generating a second color map with from a second set of colors including an additional color to the first set of colors;

receiving an input pixel value;

selecting a color value from the first color map for an output pixel value when the additional color is not present in the input pixel value;

selecting a color value from the second color map for an output pixel value when a presence of the additional color in the input pixel value is above a threshold; and selecting a color value from a merged color map, formed from the first color map and the second color map, when the presence of the additional color in the input pixel value is below the threshold.

21. The medium of claim 20, wherein the method includes generating a first color map and a second color map which are indexed to an international color consortium standard.

22. The medium of claim 20, wherein the method includes generating the second color map from the first set of colors and a secondary color for a given printing system.

23. The medium of claim 20, wherein the method includes generating the second color map from the first set of colors and a tertiary color for a given printing system.

24. The medium of claim 20, wherein the medium is located on a printing device and the printing device is connected to a scanner via a network.

* * * * *

UNITED STATES PATENT AND TRADEMARK OFFICE
CERTIFICATE OF CORRECTION

PATENT NO. : 7,463,385 B2
APPLICATION NO. : 11/173010
DATED : December 9, 2008
INVENTOR(S) : Jay S. Gondek et al.

It is certified that error appears in the above-identified patent and that said Letters Patent is hereby corrected as shown below:

On the Title page, in field (75), in "Inventors", in column 1, line 1, delete "Gondak" and insert -- Gondek --, therefor.

In column 10, line 28, in Claim 12, after "map" delete "with".

In column 12, line 6, in Claim 20, after "map" delete "with".

Signed and Sealed this

Fifth Day of May, 2009

JOHN DOLL
*Acting Director of the United States Patent and Trademark Office*